US012664886B2

(12) United States Patent
Rossi et al.

(10) Patent No.: US 12,664,886 B2
(45) Date of Patent: Jun. 23, 2026

(54) COMPUTER-IMPLEMENTED METHOD AND SYSTEM FOR CLASSIFYING A TRAFFIC SITUATION

(71) Applicant: dSPACE GmbH, Paderborn (DE)

(72) Inventors: André Rossi, Paderborn (DE); Luka Karaman, Zagreb (HR); Philipp Atorf, Paderborn (DE); Jakov Topic, Zagreb (HR); Cathrina Sowa, Paderborn (DE)

(73) Assignee: dSPACE GmbH, Paderborn (DE)

( * ) Notice: Subject to any disclaimer, the term of this patent is extended or adjusted under 35 U.S.C. 154(b) by 48 days.

(21) Appl. No.: 18/737,259

(22) Filed: Jun. 7, 2024

(65) Prior Publication Data

US 2024/0412625 A1      Dec. 12, 2024

(30) Foreign Application Priority Data

Jun. 7, 2023      (DE) ..................... 10 2023 114 947.4

(51) Int. Cl.
*G08G 1/01* (2006.01)
*G06F 11/34* (2006.01)

(52) U.S. Cl.
CPC ....... *G08G 1/0133* (2013.01); *G06F 11/3457* (2013.01)

(58) Field of Classification Search
CPC .............. G08G 1/0133; G08G 1/0108; G06F 11/3457; G06F 18/29; B60W 40/04; B60W 60/0027; G06V 20/56
See application file for complete search history.

(56) References Cited

U.S. PATENT DOCUMENTS

2021/0053569 A1*   2/2021   Censi ................... G08G 1/0112

FOREIGN PATENT DOCUMENTS

DE        102013003944 A1    9/2014
DE        102022112060 B3    4/2023

OTHER PUBLICATIONS

Chuckravanen et al, "Allen's Interval Algebra and Smart-type Environments"—2017—International Journal on Advances in Software.

(Continued)

*Primary Examiner* — Yuen Wong
(74) *Attorney, Agent, or Firm* — Muncy, Geissler, Olds & Lowe, P.C.

(57)      ABSTRACT

A computer-implemented method and system for classifying a predefined traffic situation comprised by a data record of environment data of a motor vehicle, with an application of a directed graph to the first data record. Nodes of the directed graph segment the first data record in each case into at least one segment of a movement behavior of the ego vehicle and/or the fellow vehicle relative to a vehicle environment according to a first condition satisfied in a time interval comprising edges of the directed graph symbolizing links between the respective nodes. The predefined traffic situation is classified if all of the specified segments meet a second condition of the predefined traffic situation. A class is outputted representing the predefined traffic situation and/or a respective start and end time of the second data record comprising a segment representing the predefined traffic situation.

14 Claims, 7 Drawing Sheets

(56) References Cited

OTHER PUBLICATIONS

Hauer et al, "Scenario optimization for the validation of automated and autonomous driving systems", Jan. 17, 2019; arXiv: 1901. 05680v1—Abstract in English-.

Mudrowa et al, "Task Scheduling for Mobile Robots Using Interval Algebra" - May 2015—*IEEE 2015 JEEE International Conference on Robotics and Automation (ICRA).*

Nebel B et al, "Principles of Knowledge Representation and Reasoning" Qualitative Representation and Reasoning, Allen's Interval Calculus—Feb. 13, 2012, Albert-Ludwigs-Universitaet Freiburg.

Yang Zhen et al, "Cooperative Control of Heterogeneous Connected Vehicles with Directe Acyclic Interactions", Aug. 20, 2018—IEEE arXiv:1805.04304v2.

Yu Xiao et al; "Leader-follower formation of vehicles with velocity constraints and local coordinate frames"—Jun. 9, 2017 Department of Mechanical and Biomedical Engineering, City University of Hong Kong.

* cited by examiner

Provision of first data record ——— S1, DS1

Applying a directed graph ——— S2,G,14

Classifying traffic situation ——— S3,16

Outputting a class ——— S4,DS2,K ego trajectory lane keep lane change

Fellow- trajectory lane keep Fellow

| 10 | Ego vehicle |
|----|-------------|
| 12 | Fellow vehicle |
| 11 | nodes |
| 14 | 1st condition |

| | | |
|---|---|---|
| 10 | Ego vehicle | |
| 12 | Fellow vehicle | |
| 11 | nodes | |
| 14 | 1st condition | |

| 10 | Ego vehicle |
|----|-------------|
| 12 | Fellow vehicle |
| 11 | nodes |
| 16 | 2$^{nd}$ condition |

A,11,drift-out,14 cut-in,11,A,14 meets,A,16,18 overtaking scenario

| 20 | Data memory |
|----|-------------|
| 22 | 1$^{st}$ calculation unit |
| 24 | 2$^{nd}$ calculation unit |
| 26 | Data output unit |

20,DS1     22,G     24

26,K,DS2

COMPUTER-IMPLEMENTED METHOD AND SYSTEM FOR CLASSIFYING A TRAFFIC SITUATION

This nonprovisional application claims priority under 35 U.S.C. § 119 (a) to German Patent Application No. 10 2023 114 947.4, which was filed in Germany on Jun. 7, 2023, and which is herein incorporated by reference.

BACKGROUND OF THE INVENTION

Field of the Invention

The present invention relates to a computer-implemented method for classifying a predefined traffic situation comprised by a data record of environment data of a motor vehicle. The present invention also relates to a system for classifying a predefined traffic situation comprised by a data record of environment data of a motor vehicle.

Description of the Background Art

In order to create test scenarios for simulations, it is necessary to carry out test drives. The sensor data obtained in this way is then abstracted into a logical scenario.

Input data are raw data, i.e., sensor data from real test drives in terms of recordings of radar echoes, 3D point clouds from LiDAR measurements and image data. Result data are simulated driving scenarios that include an environment on the one hand and trajectories on the other.

"Scenario optimization for the validation of automated and autonomous driving systems" (Florian Hauer, Bernd Holzmüller, arXiv: 1901.05680)" discloses methods for the verification and validation of automated and autonomous driving systems, in particular finding suitable test scenarios for virtual validation.

The test methodology provides for the adaptation of a metaheuristic search in order to optimize scenarios. For this purpose, a suitable search space and a suitable quality function must be set up. Parameterized scenarios are derived from an abstract description of the functionality and use cases of the system.

It is assumed that certain parameters exert a great influence on the situation. For example, a situation in which emergency braking takes place is mainly determined by the speeds of the two road users. It is therefore crucial for the user to know a distribution of the values of these parameters and to know which parts are not comprised by the data or the simulation. The missing data points need to be collected either in reality or in simulation.

For the user, an effective evaluation of the generated data record is therefore desirable in order to identify critical situations and test them in slightly different versions of the same simulation scenario.

Furthermore, most of the scenarios created for the testing of autonomous driving functions are defined a priori and are based on expert knowledge of which scenarios are needed for which test purpose.

On the other hand, methods that rely on real-world data are based on machine learning algorithms, which makes it difficult to generalize in the event that a different, similar traffic situation is desired.

As a result, there is a need to improve existing methods for analyzing driving scenario data records in order to enable effective identification and categorization of critical situations.

SUMMARY OF THE INVENTION

It is therefore an object of the invention to provide a method for classifying a predefined traffic situation comprised by a data record of environment data of a motor vehicle, which enables an effective identification and categorization of critical traffic situations of interest.

According to an example of the invention, the object is achieved by a computer-implemented method for classifying a predefined traffic comprised by a data record of environment data of a motor vehicle.

The invention also relates to a computer-implemented method for classifying a predefined traffic situation, which is comprised by a data record of environment data of a motor vehicle.

The method includes the provision of a first data record, in particular a data stream, of sensor data covering a plurality of traffic situations of a journey of an ego vehicle and/or a fellow vehicle detected by at least one on-board environment perception sensor.

In general the term "ego vehicle" can represent a virtual vehicle in the center of a simulation or a test. E.g. the vehicle for that a new function is to be developed or tested. Typically, one skilled in the art uses such to distinguish a central vehicle ("ego") from other vehicles or traffic participants (pedestrians, bicycles, etc.) that are usually called "fellows" or "fellow vehicles" that appear in a simulation or test and can interact or have an impact on the ego. For example, there may be several vehicles in a scenario in order to test a function of the ego vehicle but these fellow vehicles may not have the function to be tested, e.g. automatic braking systems.

Furthermore, the method involves applying a directed graph to the first data record, wherein nodes of the directed graph segment the first data record into at least one segment of a movement behavior of the ego vehicle and/or the fellow vehicle relative to a vehicle environment according to a first condition satisfied in a time interval, wherein edges of the directed graph symbolize links between the respective nodes.

The method also includes a classification of the predefined traffic situation, if all of the specified segments satisfy a second condition of the predefined traffic situation, and the output of a class representing the predefined traffic situation and/or a respective start and end time of the second data record comprising the segment representing the predefined traffic situation.

The invention also relates to a system for classifying a predefined traffic situation comprised by a data record of environment data of a motor vehicle.

The system comprises a data memory that is configured to provide a first data record, in particular a data stream, of a plurality of traffic situations of a journey of an ego vehicle and/or fellow vehicle detected by at least one on-board environment perception sensor.

Furthermore, the method includes a first calculation unit, which is configured to apply a directed graph to the first data record, wherein nodes of the directed graph segment the first data record into at least one segment of a movement behavior of the ego vehicle and/or fellow vehicle relative to a vehicle environment according to a first condition satisfied in a time interval, wherein edges of the directed graph symbolize links between the respective nodes.

The system also includes a second calculation unit, which is configured to classify the predefined traffic situation if all of the specified segments satisfy a second condition of the predefined traffic situation, and a data output unit, which is configured to output a second data record comprising a class representing the predefined traffic situation and/or a respective start and end time of the segment representing the predefined traffic situation.

The first and second calculation unit can each be, for example, a separate processor or the same processor, which can be arranged in a computer or in one or more Electronic Control Units (ECUs) of a vehicle or testing equipment containing processors and memory that are adapted to be attached and integrated onto a vehicle during testing.

The invention also relates to a computer program with program code to carry out the inventive method for classifying a predefined traffic situation comprised by a data record of environment data of a motor vehicle when the computer program is executed on a computer.

An idea of the present invention is to perform an improved data selection and, if necessary, based thereupon in a subsequent step, an improved parameter extraction of traffic situations contained in the data record of sensor data of the journey of an ego vehicle and/or fellow vehicle detected by the first plurality of on-board environment perception sensors.

This means that the data can be automatically searched for relevant situations and then only the correspondingly extracted traffic situations can be brought into the simulation.

The present invention therefore provides a method of selecting scenarios that can be used to identify traffic situations from real-world data. The proposed method is graph-based and makes it possible to meaningfully define traffic situations that are to be identified in the raw measurement data provided.

The graph-based structure is inherently linked to situational similarity-similar situations are mapped to corresponding similar graphs.

The graph-based templates can be easily modified to identify different scenarios, and the graphs can be reused and combined to describe more complex traffic behavior. Several graphs used in parallel thus make it possible to describe the entire data stream with blocks of identified traffic situations such as cut-ins.

Direct visibility of the coverage of the data stream through identified traffic situations. In addition, the user can specify the templates to be identified without writing any code. The user can decide for himself how simple or complex and detailed the required template should be.

A traffic situation can be a small, elementary and/or larger scenario or traffic scenario having a plurality of road users.

The predefined traffic situation to be classified can be determined in advance, wherein the directed graph determines segments of the predefined traffic situation in each case. Thus, according to the specification, it can advantageously be determined or classified in binary form whether the segments comprised by the respective traffic situation are present in the first data record.

Each node can have at least one input and exactly one output, wherein the at least one input of each node is given by an edge of another node or by the first data record. The nodes are thus able to process one or more inputs from a previous layer, so that vehicle behavior of a higher logical level or abstraction level can be determined with each subsequent layer.

Each node can have an algorithm which is applied to input data of the node, wherein the algorithm classifies whether the first condition of the movement behavior of the ego vehicle and/or the fellow vehicle relative to the vehicle environment is met.

The classification can be a binary classification, i.e., a determination as to whether a predefined condition concerning a segment is true or false.

The algorithm of the respective node can output a respective start and end time of the segment representing the movement behavior if the first condition is met. In this way, the relevant segment in which a certain vehicle behavior occurs can be determined in an advantageous manner.

The segment of the movement behavior of the ego vehicle and/or the fellow vehicle relative to the vehicle environment can be a time interval comprising a start and end time of the movement behavior of the ego vehicle and/or the fellow vehicle relative to the vehicle environment comprised by the first data record, in particular the data stream.

Thus, based on the first data record comprising the data stream of sensor data comprising a plurality of traffic situations, the corresponding time segment that comprises the movement behavior of the ego vehicle and/or the fellow vehicle of interest can be determined.

The directed graph comprising a first layer comprises at least one node whose input is the first data record, wherein a second layer of the directed graph comprising at least one first node and a second node segments the first data record in each case according to the first condition into at least one segment of the movement behavior of the ego vehicle and/or the fellow vehicle relative to a vehicle environment, and wherein a third layer of the directed graph comprising at least one node classifies the predefined traffic situation using the time intervals output by the nodes of the second layer, if the combination of the specified time intervals meets the second condition of the predefined traffic situation.

The respective layers of the graph thus fulfil the task of successively segmenting the first data record according to the respective specifications in order to check whether a higher-level traffic situation is comprised by the data using the specific segments.

The second condition of the predefined traffic situation specifies that the segments of the ego vehicle determined according to the first condition and/or at least one segment of a movement behavior of the fellow vehicle may take place in a predefined sequence and/or within a predefined time interval. This ensures that the specific segments occur in a corresponding sequence that characterizes the predefined traffic situation.

The movement behavior of the ego vehicle and/or the fellow vehicle relative to the vehicle environment can include all vehicle actions that can be identified in the first data record and represent the movement behavior. This means that all data collected by different types of sensors as well as events that can be identified in the data can be used to identify the predefined traffic situation.

The movement behavior of the ego vehicle and/or the fellow vehicle relative to the vehicle environment can be a lateral and/or longitudinal behavior of the ego vehicle relative to a traffic infrastructure and/or to at least one fellow vehicle, and/or the lateral and/or longitudinal behavior of the fellow vehicle relative to a traffic infrastructure and/or to at least one ego vehicle, wherein the movement behavior of the ego vehicle and/or the fellow vehicle relative to the vehicle environment includes lane keeping, lane change, turning, constant or changing acceleration and resulting speed, flashing brake lights, passing an object in the vehicle environment and/or recognizing a traffic sign.

The movement behavior of the ego vehicle that can be identified in the first data record relative to a traffic infrastructure and/or at least one fellow vehicle, and vice versa, thus can include a plurality of different behaviors of the vehicles involved.

The sensor data of the journey of the ego vehicle and/or the fellow vehicle collected by at least one on-board environment perception sensor can be, for example, position data of a GNSS sensor, IMU data, camera data, LiDAR data, radar data and/or ultrasonic data. The sensor data can thus be obtained from a number of different data sources.

A virtual test for the validation of an automated driving function of the motor vehicle can be carried out on the basis of the output second data record. The specific traffic situation can thus form the basis of a virtual test to validate the automated driving function of the motor vehicle.

The output of the directed graph and an output of another directed graph can be used to classify another predefined traffic situation, wherein if a combination of the outputs of the directed graph and the further directed graph satisfy a third condition of the further predefined traffic situation, the further predefined traffic situation is classified. A combination of a number of identified traffic situations can thus be used in an advantageous way to determine a further traffic situation.

The features described herein of the computer-implemented method for classifying a predefined traffic situation comprised by a data record of environment data of a motor vehicle are also applicable to the inventive system for classifying a predefined traffic situation comprised by a data record of environment data of a motor vehicle, and vice versa.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

6

Figure 8:
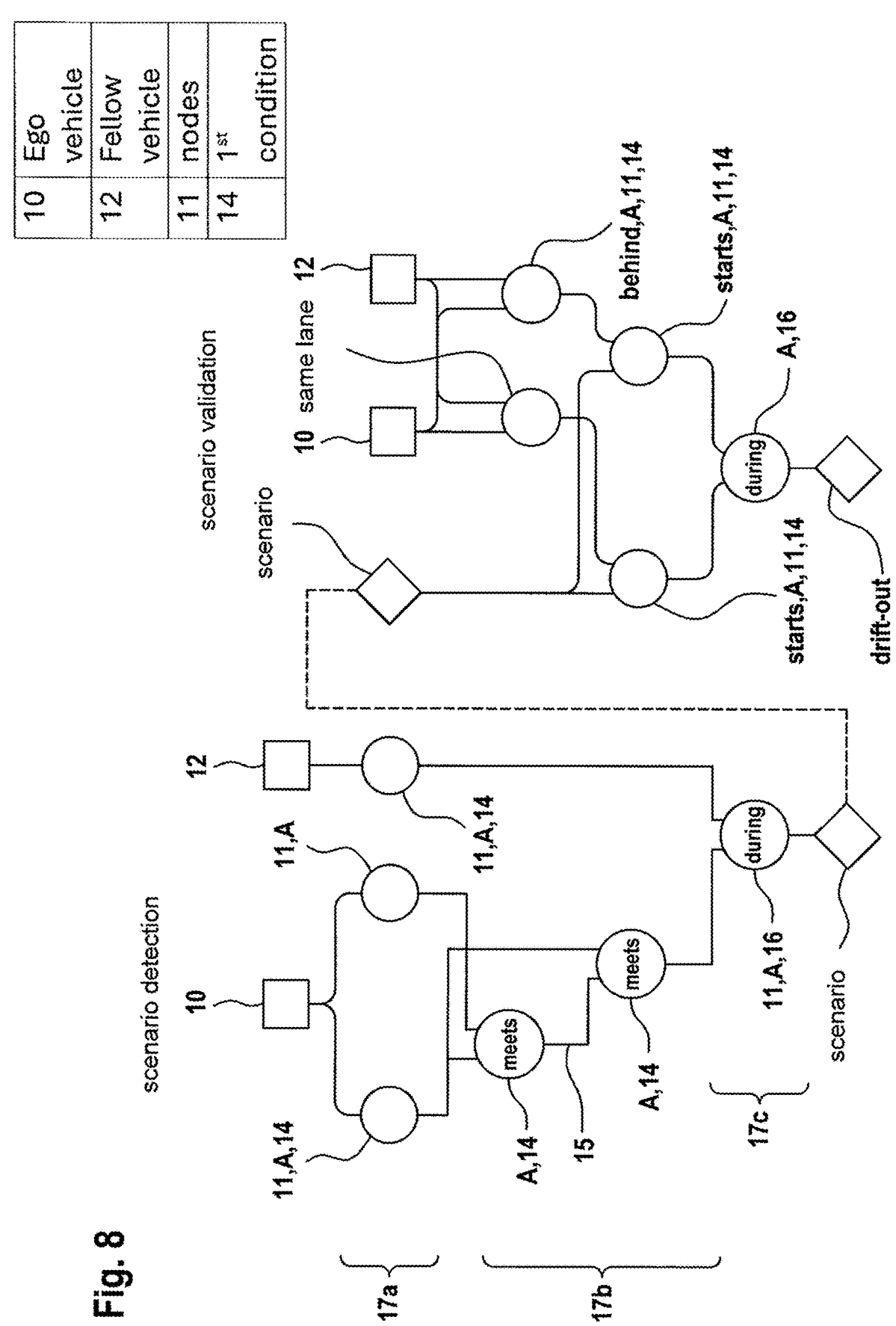
Figure 9:
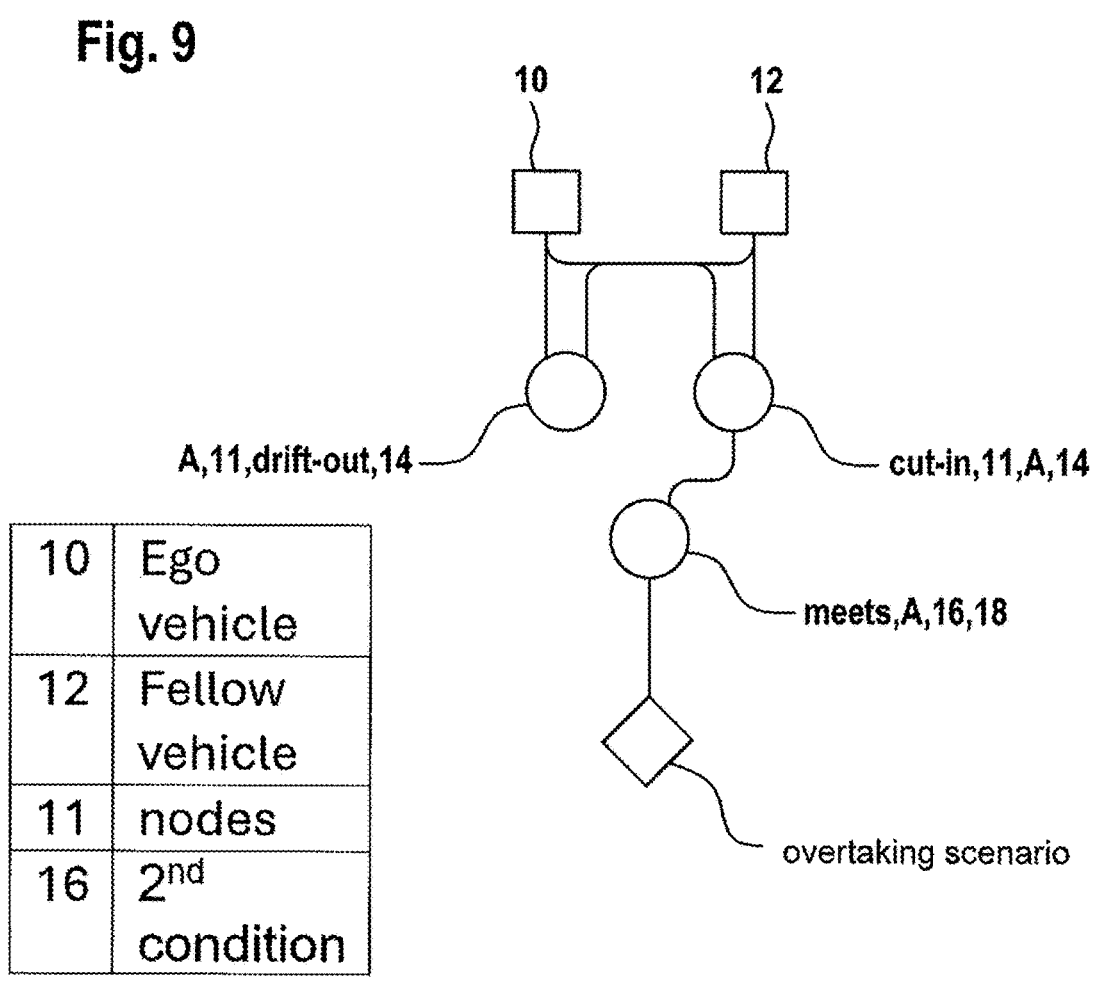
Figure 10:
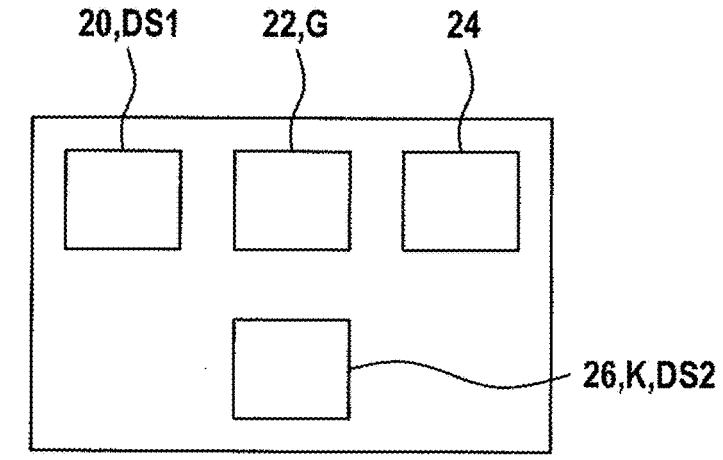

FIG. 8 shows a graph for determining a drift-out scenario according to the example of the invention;

FIG. 9 shows a graph for determining an overtaking maneuver according to the example of the invention; and FIG. 10 shows a schematic representation of a system for classifying a predefined traffic situation comprised by a data record of environment data of a motor vehicle according to the example of the invention.

DETAILED DESCRIPTION

Figure 1A:
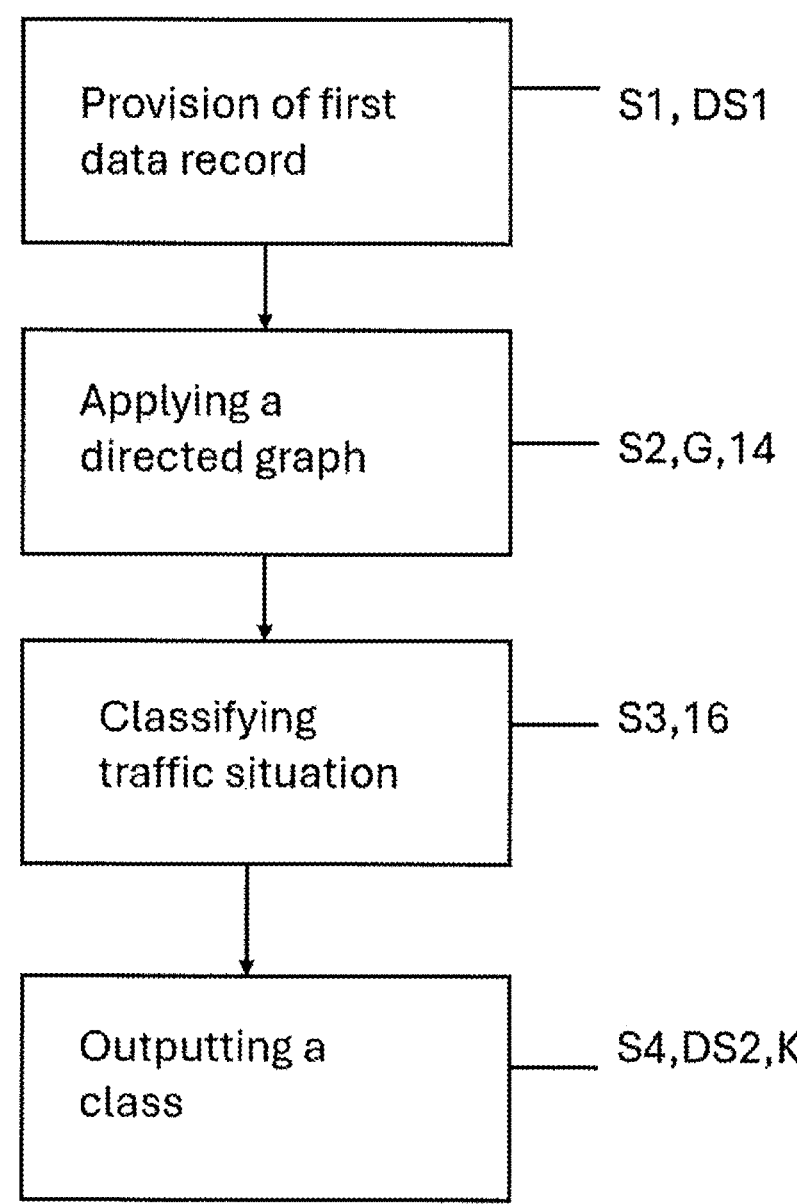
FIG. 1a shows a flow chart of a computer-implemented method for classifying a predefined traffic situation comprised by a data record of environment data of a motor vehicle according to an example of the invention.

FIG. 1a shows a flow chart of a computer-implemented method for classifying a predefined traffic situation comprised by a data record of environment data of a motor vehicle according to an example of the invention.

The method comprises the provision S1 of a first data record DS1, in particular a data stream, of sensor data covering a plurality of traffic situations of a journey of an ego vehicle 10 and/or a fellow vehicle 12 collected by at least one on-board environment perception sensor.

Furthermore, the method involves applying S2 a directed graph G to the first data record DS1, wherein nodes 11 of the directed graph G segment the first data record DS1, in each case according to a first condition 14 satisfied in a time interval, into at least one segment of a movement behavior of the ego vehicle 10 and/or the fellow vehicle 12 relative to a vehicle environment, wherein edges 15 of the directed graph G symbolize links between the respective nodes 11.

The method also includes classifying S3 the predefined traffic situation, if all of the specified segments meet a second condition 16 of the predefined traffic situation; and outputting S4 a class K representing the predefined traffic situation and/or a respective start and end time of the second data record DS2 representing the predefined traffic situation.

Figure 1B:
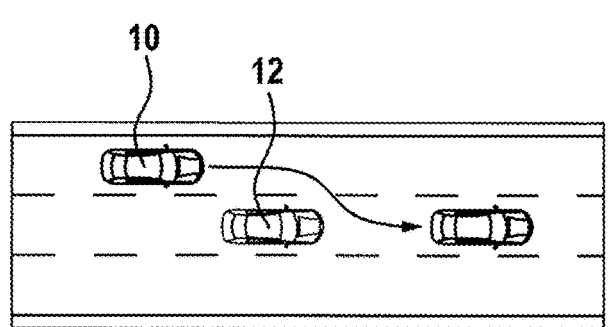
FIG. 1b shows a schematic representation of a cut-in scenario according to the example.

The description of the concept according to the invention is based on the example of a cut-in scenario shown in FIG. 1b. In this scenario, an ego vehicle 10 drives in the left lane until it is in front of the other vehicle, i.e., fellow vehicle 12, that is driving in the middle lane, and then changes lanes to that of the other vehicle.

In order to simplify the description of scenarios such as the cut-in, Allen's interval algebra is used in the following description, with which relationships between time intervals can be defined.

In the context of scenarios, elementary vehicle movement behaviors are used as a time interval to describe a vehicle's movement. For example, the movement of the ego vehicle 10 can be divided into three intervals: an interval to keep the lane, followed by an interval to change the lane, followed by another interval to keep the lane.

By applying Allen's interval algebra to the time intervals used to describe the movement of the vehicles, the cut-in scenario can be described with three simple statements:

Ego Sequence:

Lane Keep meets Lane Change meets Lane Keep.

Fellow Sequence:

Lane Keep.

The ego sequence can also occur during the fellow sequence.

Figure 2:
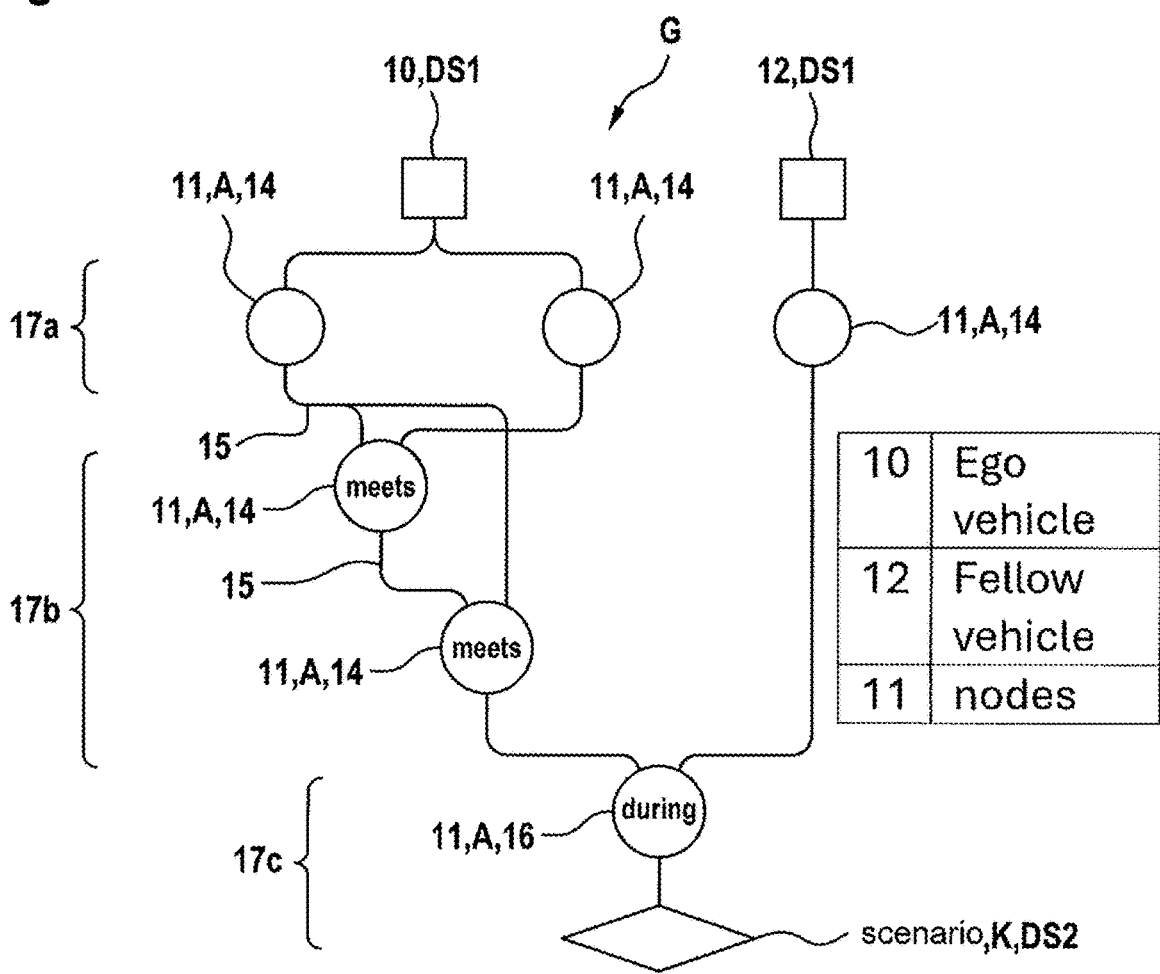
FIG. 2 shows a graph for determining the cut-In scenario according to the example of the invention.

Based on this description, a calculation graph G is created to determine whether a scenario given as input can be categorized or classified as a cut-in scenario. The resulting graph G for recognizing a cut-in scenario is shown in FIG. 2.

The graph G includes nodes 11 connected by edges 15. Each node 11 has one or more inputs and always produces one output. The inputs of the nodes 11 are defined by the connected edges 15 of other nodes 11. Each node 11 implements a check that returns time intervals of the segments for which the check of the entered time intervals is true.

The graph G contains different types of nodes 11. The first layer 17a of nodes 11 of the graph G is input data based on the movement data of the vehicles, e.g., the trajectories of the vehicles. A second layer 17b of the graph G are nodes 11, which analyze the trajectories and divide them into time intervals such as "Lane Keep".

These time intervals are then combined by the following nodes 11 to check whether the time dependencies between the segmented time intervals correspond to, e.g., "meet", the scenario description. After traversing the last node 11 of the graph G, the time interval of the identified cut-in scenario is output.

The creation of the graph G is described below. The first step in determining scenarios or traffic situations is to segment the trajectories of the road users into time intervals in order to semantically describe the movement. To do this, nodes 11 are used, which implement segmentation algorithms that can segment a trajectory into the lateral time intervals or segments, e.g., into "Lane Keep" and "Lane Change" segments for the cut-in scenario.

Figure 3:
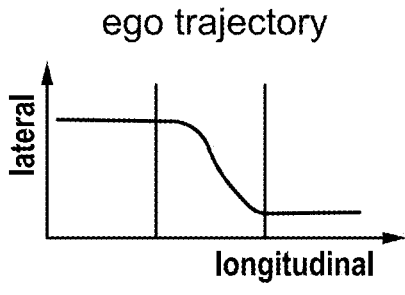
FIG. 3 shows a schematic representation of a trajectory of an ego vehicle according to the example of the invention.
Figure 3:
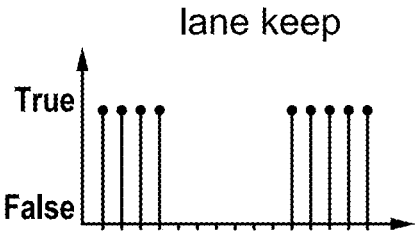
Figure 3:
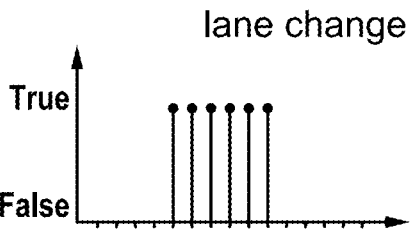
Figure 4:
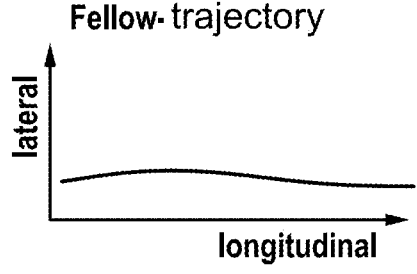
FIG. 4 shows a schematic representation of a trajectory of a fellow vehicle according to the example of the invention.
Figure 4:
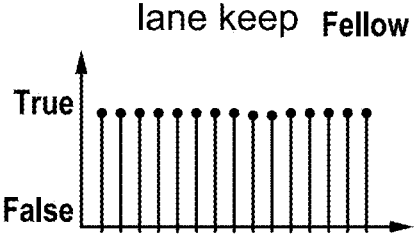

For the ego vehicle 10 from the cut-in example in FIG. 1, the trajectory can be segmented into the time intervals shown in FIG. 3. As mentioned above, the segmentation of the trajectory results in three time intervals: "Lane Keep", "Lane Change" and another "Lane Keep".

Figure 5:
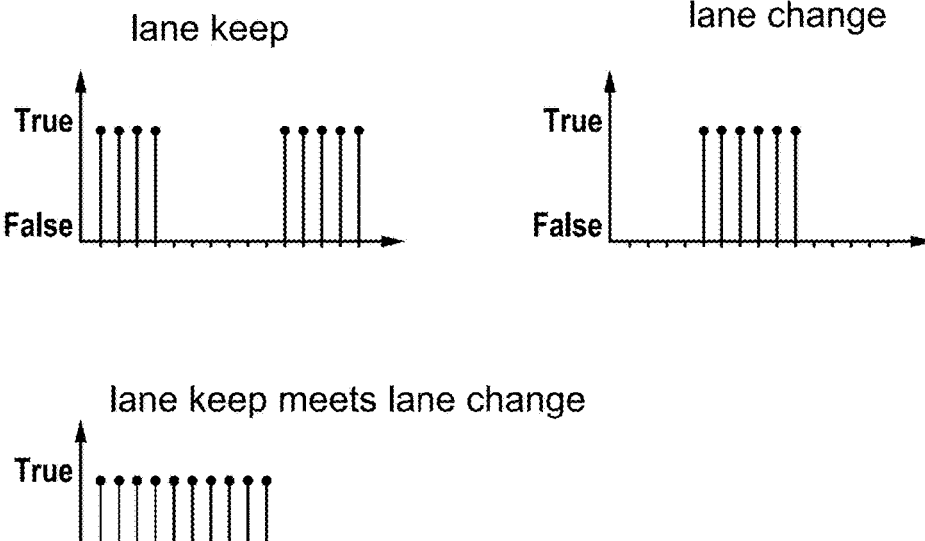
FIG. 5 shows a schematic representation of vehicle maneuvers during various time intervals according to the example of the invention.

Performing the same segmentation for the trajectory of the fellow vehicle 12 from the example results in only a "Lane Keep" segment (FIG. 5).

After segmentation, the time intervals are recombined using nodes 11, which perform checks based on Allen's interval algebra. The first node 11 based on Allen's interval algebra to be used for the graph G of the cut-in scenario is "Meet". The node 11 "Meet" has two inputs: the "Lane Keep" and "Lane Change" time intervals from the segmentation nodes 11 of the previous layer of graph G.

The node 11 "Meet" check provides the time interval in which a "Lane Keep" time interval is immediately followed by a "Lane Change" time interval. In the example in FIG. 5, this is the case for the first time interval of the "Lane Keep" and "Lane Change" segmentation results. The output of this node 11 is the combined time interval of the "Lane Keep" and "Lane Change" time intervals.

The same procedure is applied to the next "Meets" node 11, which checks whether the output of the first "Meets" node 11 is immediately followed by another "Lane Keep" time interval. The last node 11 of the graph G "During" checks whether the time interval of the output of the "Meets" node 11, which describes the sequence of the ego vehicle 10, is in the same time interval as the identified "Lane Keep" time interval of the fellow vehicle 12.

Figure 6:
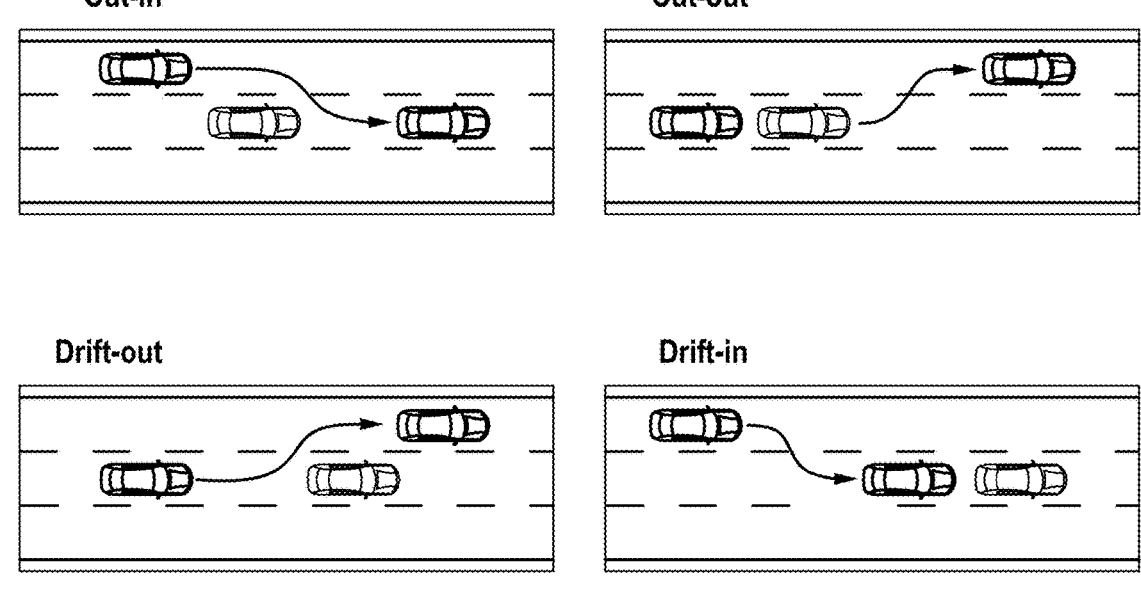
FIG. 6 shows a schematic representation of different scenarios according to the example of the invention.

Only looking at the temporal description of the movement of the vehicles, it can be seen that it is possible to determine several other scenarios using graph G, which in itself was designed only to identify the cut-in scenario (FIG. 6). In all four scenarios, the ego and fellow vehicles perform the same movement if additional scenario parameters are disregarded.

Therefore, additional nodes 11 need to be added to the graph G to validate additional scenario parameters, which in the case of the cut-in scenario are the spatial parameters used to describe the relative positions of the vehicles and the relative lanes on which the vehicles travel. To differentiate the cut-in scenario, two additional conditions can be added:

1) Ego and fellow vehicles 10, 12 cross the finish line in the same lane.
2) The ego vehicle 10 finishes ahead of the fellow vehicle 12.

Figure 7:
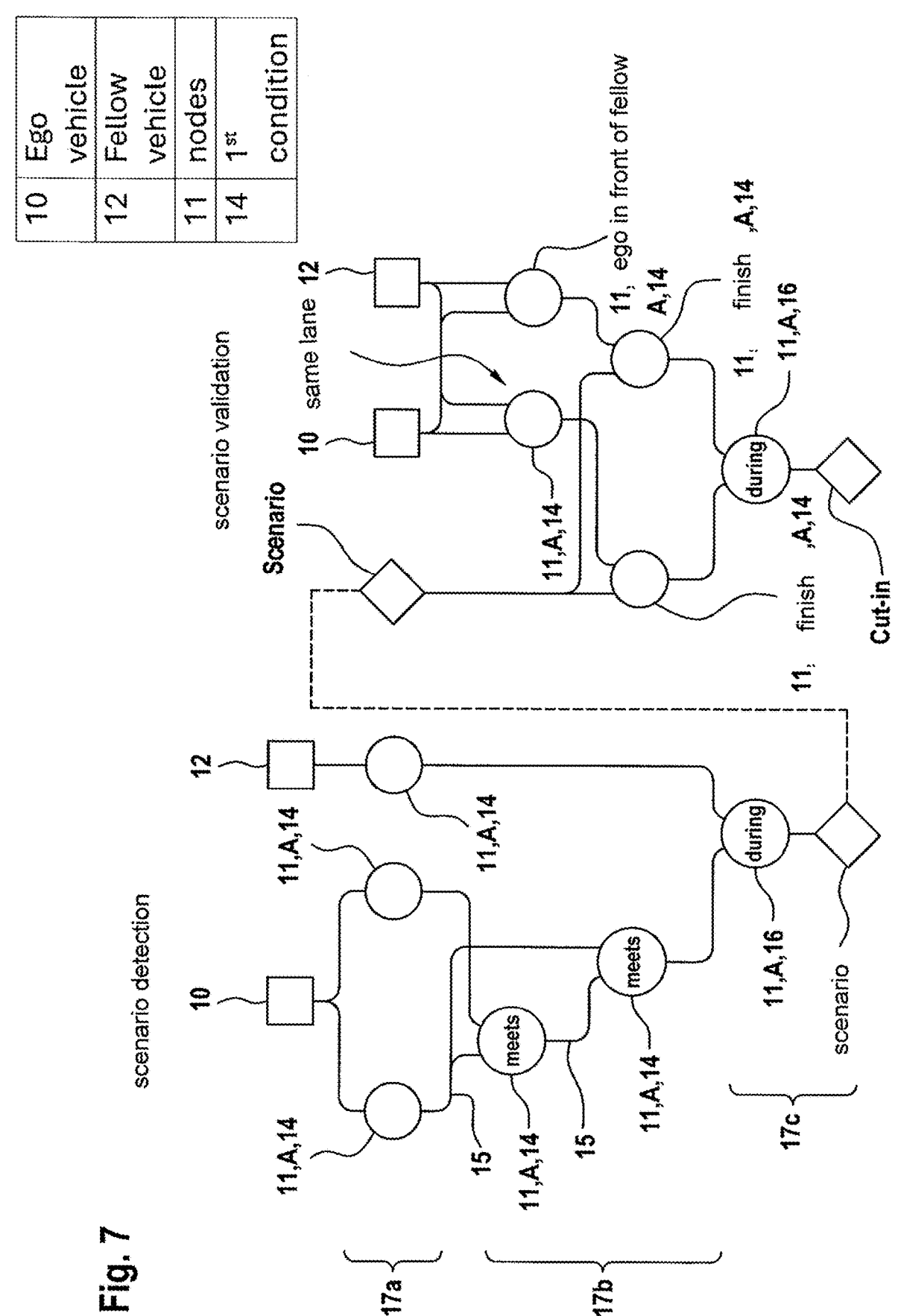
FIG. 7 shows a graph for determining the cut-In scenario according to the example of the invention.

If these two conditions are converted and added to the figure to identify a cut-in scenario, the final diagram looks like the one in FIG. 7.

In the second graph G, there is again a first layer 17a with the nodes 11 "Same Lane" and "Ego in front of fellow", which perform a segmentation based on the vehicle trajectories and output the time intervals in which both vehicles are in the same lane, as well as the time interval in which the ego vehicle 10 is in front of the fellow vehicle 12.

In the second layer 17b of the second graph G, the time intervals are calculated as to whether the detected time interval of the first graph G was finished by the time interval of the "Same Lane" and "Ego in front of fellow" node output. Finally, the last node 11, "During", checks whether the resulting time intervals take place in the same amount of time. If there is a time interval left at the end, a cut-in scenario has been identified.

In FIG. 8, only three nodes 11 of the graph G need to be exchanged to identify a cut-in scenario: "Infront"=> "Behind" and "Finishes"=> "Starts" to identify the drift-out scenario.

FIG. 9 shows how graphs G, once defined, can be redefined as nodes 11 to identify the drift-out and cut-in scenarios and then combined to identify more complex traffic scenarios such as an overtaking scenario.

FIG. 10 shows a schematic representation of a system for classifying a predefined traffic situation comprised by a data record of environment data of a motor vehicle according to an example of the invention.

The system 1 comprises a data memory 20, which is configured to provide a first data record DS1, in particular a data stream, of sensor data comprising a plurality of traffic situations of a journey of an ego vehicle 10 and/or the fellow vehicle 12 collected by at least one on-board environment perception sensor.

Furthermore, the system 1 comprises a first calculation unit 22, which is configured to apply a directed graph G to the first data record DS1, wherein nodes 11 of the directed graph G segment the first data record DS1 into at least one segment of a movement behavior of the ego vehicle 10 and/or the fellow vehicle 12 relative to a vehicle environment according to a first condition 14 met in a time interval, wherein edges 15 of the directed graph G symbolize links between the respective nodes 11.

The system 1 also includes a second calculation unit 24, which is configured to classify the predefined traffic situation if all of the specified segments meet a second condition of the predefined traffic situation, and a data output unit 26, which is configured to output a second data record DS2 comprising a class K representing the predefined traffic situation and/or a respective start and end time of the segment representing the predefined traffic situation.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A computer-implemented method for classifying a predefined traffic situation comprised by a data record of environment data of a motor vehicle, the method comprising:

providing a first data record or a data stream of sensor data comprising a range of traffic situations from a journey of an ego vehicle and/or a fellow vehicle collected by at least one on-board environment perception sensor;

applying a directed graph to the first data record, wherein nodes of the directed graph segment the first data record into at least one segment of a movement behavior of the ego vehicle and/or the fellow vehicle relative to a vehicle environment according to a first condition met in a time interval, and wherein edges of the directed graph symbolize links between the respective nodes;

classifying the predefined traffic situation, when all of the specified segments meet a second condition of the predefined traffic situation; and outputting a class representing the predefined traffic situation and/or a respective start and end time of a second data record comprising the segment representing the predefined traffic situation.

2. The computer-implemented method according to claim 1, wherein the predefined traffic situation to be classified is determined in advance, and wherein the directed graph determines segments of the predefined traffic situation in each case.

3. The computer-implemented method according to claim 1, wherein each node has at least one input and exactly one output, and wherein at least one input of each node is given by an edge of another node or by the first data record.

4. The computer-implemented method according to claim 1, wherein each node has an algorithm that is applied to input data of the node, and wherein the algorithm classifies whether the first condition of the movement behavior of the ego vehicle and/or the fellow vehicle relative to the vehicle environment is met.

5. The computer-implemented method according to claim 4, wherein the algorithm of the respective node outputs a respective start and end time of the segment representing the movement behavior when the first condition is met.

6. The computer-implemented method according to claim 1, wherein the segment of the movement behavior of the ego vehicle and/or the fellow vehicle relative to the vehicle environment is a time interval comprising a start and end time of the movement behavior of the ego vehicle and/or the fellow vehicle comprised by the first data record or the data stream, relative to the vehicle environment.

7. The computer-implemented method according to claim 6, wherein the directed graph comprises a first layer that comprises at least one node, an input of which is the first data record, wherein a second layer of the directed graph comprising at least one first node and a second node segments the first data record in each case corresponding to the first condition into at least one segment of the movement behavior of the ego vehicle and/or the fellow vehicle relative to the vehicle environment, and wherein a third layer of the directed graph comprising at least one node classifies the predefined traffic situation using time intervals output by the nodes of the second layer, when a combination of the specified time intervals satisfies the second condition of the predefined traffic situation.

8. The computer-implemented method according to claim 7, wherein the second condition of the predefined traffic situation specifies that the segments of the ego vehicle and/or at least one segment of a movement behavior of the fellow vehicle determined according to the first condition take place in a predefined sequence and/or within a predefined time interval.

9. The computer-implemented method according to claim 1, wherein the movement behavior of the ego vehicle and/or the fellow vehicle relative to the vehicle environment includes all vehicle actions representing the movement behavior detectable in the first data record.

10. The computer-implemented method according to claim 1, wherein the movement behavior of the ego vehicle and/or the fellow vehicle relative to the vehicle environment is a lateral and or longitudinal behavior of the ego vehicle relative to a traffic infrastructure and/or at least one fellow vehicle and/or the lateral and/or longitudinal behavior of the fellow vehicle is relative to a traffic infrastructure and/or at least one ego vehicle, wherein the movement behavior of the ego vehicle and/or the fellow vehicle relative to the vehicle environment includes lane keeping, lane change, turning, constant or changing acceleration and resulting speed, flashing brake lights, passing an object in the vehicle environment and/or recognizing a traffic sign.

11. The computer-implemented method according to claim 1, wherein the sensor data of the journey of the ego vehicle and/or the fellow vehicle collected by at least one on-board environment perception sensor are position data of a GNSS sensor, IMU data, camera data, LiDAR data, radar data and/or ultrasonic data.

12. The computer-implemented method according to claim 1, wherein a virtual test is performed on at basis of an output second data record for a validation of an automated driving function of the motor vehicle.

13. The computer-implemented method according to claim 1, wherein the output of the directed graph and an output of another directed graph is used to classify another predefined traffic situation, and wherein when a combination of the outputs of the directed graph and a further directed graph satisfy a third condition of a further predefined traffic situation, the further predefined traffic situation is classified.

14. A system for classifying a predefined traffic situation comprised by a data record of environment data of a motor vehicle, the system comprising a processor and memory configured to:

provide a first data record or a data stream of sensor data comprising a plurality of traffic situations of a journey of an ego vehicle and/or a fellow vehicle collected by at least one on-board environment perception sensor;

apply a directed graph to the first data record, wherein nodes of the directed graph segment the first data record in each case into at least one segment of a movement behavior of the ego vehicle and/or the fellow vehicle relative to a vehicle environment according to a first condition satisfied in a time interval, wherein edges of the directed graph symbolize links between the respective nodes, the processor or a second processor classifying the predefined traffic situation when all of the specified segments meet a second condition of the predefined traffic situation; and output a second data record comprising a class representing the predefined traffic situation and/or a respective start and end time of the segment representing the predefined traffic situation.

* * * * *